United States Patent [19]
Badger

[11] Patent Number: 5,729,192
[45] Date of Patent: Mar. 17, 1998

[54] REMOTE AUTOMOBILE DISABLER DEVICE AND ASSOCIATED METHOD

[76] Inventor: Berkley C. Badger, 324 Westgate Rd., Tarpon Springs, Fla. 34689

[21] Appl. No.: 566,397

[22] Filed: Dec. 1, 1995

Related U.S. Application Data

[63] Continuation-in-part of Ser. No. 484,234, Jun. 7, 1995, abandoned.

[51] Int. Cl.⁶ .................................... B60R 25/10
[52] U.S. Cl. .................. 340/426; 307/40.2; 307/10.3; 307/10.6; 307/10.7
[58] Field of Search .......................... 340/426, 428, 340/429, 430, 425.5; 307/10.2, 10.3, 10.4, 10.5, 10.6; 180/287

[56] References Cited

U.S. PATENT DOCUMENTS

| | | |
|---|---|---|
| 3,455,403 | 7/1969 | Hawthorne . |
| 4,071,007 | 1/1978 | Arix . |
| 4,159,467 | 6/1979 | Ballin . |
| 4,177,466 | 12/1979 | Reagan . |
| 4,485,887 | 12/1984 | Morano . |
| 4,553,511 | 11/1985 | Hayakawa et al. . |
| 4,866,296 | 9/1989 | Thomas . |
| 4,940,964 | 7/1990 | Dao . |
| 4,958,084 | 9/1990 | Carlo et al. . |
| 4,990,890 | 2/1991 | Newby . |
| 5,184,584 | 2/1993 | Cantrell . |
| 5,224,567 | 7/1993 | Tomlinson . |
| 5,276,728 | 1/1994 | Pagliaroli et al. . |
| 5,432,495 | 7/1995 | Tompkins . |
| 5,449,957 | 9/1995 | Carlo . |
| 5,490,200 | 2/1996 | Snyder et al. . |

*Primary Examiner*—Jeffery Hofsass
*Assistant Examiner*—Nina Tong
*Attorney, Agent, or Firm*—Terrance L. Siemens

[57] ABSTRACT

An automobile is remotely disabled by shunting a portion of the ignition circuit. The remote automobile disabler device receives a remotely transmitted disable signal and, in one embodiment, forms a low resistance connection with the negative terminal of the battery so as to create a break in a low current capacity portion of the ignition circuit. The low current capacity portion may include a circuit breaker. In an alternative embodiment, the battery is redirected through a shunt circuit which includes a resistor. A voltage drop is thus formed which reduces the operating voltage to electronic components in the ignition circuit below the threshold voltage and disables the automobile.

4 Claims, 4 Drawing Sheets

REMOTE AUTOMOBILE DISABLER DEVICE AND ASSOCIATED METHOD

REFERENCE TO RELATED APPLICATION

This application is a Continuation-In-Part of application Ser. No. 08/484,234, filed Jun. 7, 1995, now abandoned.

FIELD OF THE INVENTION

This invention relates to security devices and methods and more particularly to security devices and methods for automobiles.

BACKGROUND OF THE INVENTION

Automobile theft is becoming more prevalent and the consequences are becoming more damaging for owners of stolen automobiles, especially for owners of the newer and more expensive automobiles on the market today. Many antitheft devices have been proposed and are currently in use to deter or prevent automobile theft such as mechanical locking devices for the steering wheel of the automobile, which prevent the thief from steering the stolen automobile, and electronic devices sensitive to vibrations in the car which trip an audible alarm or disable the starter motor. In addition, systems have been proposed whereby stolen vehicles can be located and recovered by means of a remote transmitter hidden in the automobile.

Specific examples of prior attempts to provide a satisfactory solution include U.S. Pat. No. 4,159,467 to Ballin entitled "Electronic Key For A Motor Vehicle". The electronic key of the Ballin reference includes a handheld portable transmitter which is in constant communication with a receiver maintained in the vehicle. If the transmitted signal is not received by the vehicle, the vehicle is disabled by grounding the vehicle coil. When the transmitted signal is again received by the vehicle, a relay is actuated to unground the vehicle coil. One disadvantage of this system is that it is passive, in the sense that it is automatically armed each time the transmitter is removed from the vehicle at a sufficient distance to interrupt receipt of the transmission signals by the vehicle. Such passive arming can be inconvenient when arming of the system is not desired. In addition, the Ballin system may cause substantial inconvenience to the owner of the vehicle if the battery of the transmitter were to lose power, thereby precluding the owner from starting his vehicle.

Another system is disclosed in U.S. Pat. No. 4,958,084 to Carlo et al. entitled "Self-Contained Anti-Theft Device For Motor Vehicles". The device is adapted to be placed on the battery posts of the automobile and includes two poles which are adapted to be shunted by a jumper bar. The jumper bar is normally retracted from the poles but, when the automobile is being started, the jumper bar is moved by a solenoid so as to form an electrical connection between the poles. The jumper bar is removed from the contacts in response to an unauthorized attempt to start the car by sensing the voltage drop between the terminals of the battery when the starting motor is engaged. The device also suffers the disadvantage of being passively armed, which may cause an inconvenience to the owner of the automobile.

Another prior system is disclosed in U.S. Pat. No. 4,990,890 to Newby entitled "Vehicle Security System". The vehicle security system includes an interface unit which transmits a signal from the vehicle when an unauthorized act is performed on the vehicle such as, for example, the opening of a door. The signal is received by a station which in turn transmits a return signal to the vehicle to activate an immobilizer in the vehicle. The particular type of immobilizer is not disclosed.

SUMMARY OF THE INVENTION

It is therefore an object of the invention to provide an improved automobile disabling device and method.

It is another object of the invention to provide an automobile disabling device and method which does not need to be passively or actively enabled prior to theft of the automobile.

It is yet another object of the invention to provide an automobile disabling device which can permanently disable the automobile.

It is still another object of the invention to provide an automobile disabling device and method wherein the electronic components are disabled by receiving a low operating voltage.

The above and other objects and advantages of the invention are achieved by a device and method for remotely disabling an automobile, according to one embodiment of the invention, by connecting a low current capacity portion of the ignition circuit adjacent the positive terminal of the battery, to the negative terminal of the battery through a low resistance connector so as to bypass the high resistance electronic components of the ignition circuit and form a break in the low current capacity portion.

As is well known, an automobile electrical system typically includes a battery having positive and negative terminals for supplying current, a plurality of high resistance electronic components for starting and controlling the ignition of the motor such as, for example, an electronic control module, and an ignition circuit connecting the electronic components to the terminals of the battery. The electronic components typically require an operating voltage greater than or equal to a predetermined threshold voltage.

The ignition circuit comprises several portions extending between the terminals of the battery and the high resistance components, and may include a low current capacity portion between the positive terminal of the battery and the first high resistance component.

The remote automobile disabler device of the present invention includes means for receiving a remotely transmitted disable signal, which may comprise a radio frequency receiver. The disable signal is transmitted by transmitting means such as at least one radio frequency transmission tower and/or at least one radio frequency transmission satellite.

The remote automobile disabler device also includes connecting means, responsive to the receiving means, for connecting the low current capacity portion of the ignition circuit directly to the negative terminal of the battery. The connecting means has a lower resistance than the high resistance electronic components so that the current flowing through the low current capacity portion exceeds its current capacity and a break in the ignition circuit is thereby formed.

The connecting means may also include a selectively operable switch which is closed when the receiving means receives the disable signal and which is opened when the receiving means receives an enable signal. The low current capacity portion of the ignition circuit may further include a circuit breaker which creates the break in the ignition circuit when the low current capacity portion is connected to the negative terminal of the battery. Preferably, the circuit breaker is of the self-resetting type which creates the break in the ignition circuit when the switch is closed and which resets when the switch is opened.

In an alternative embodiment, the invention may also include shunt means, responsive to the receiving means, for redirecting the current from the battery and reducing the operating voltage to the electronic components in response to a disable signal. The operating voltage to the electronic components is reduced below the threshold voltage so as to render the electronic components inoperable and disable the automobile. The shunt means may include a shunt circuit in parallel with part of the ignition circuit, a selectively operative switch responsive to the receiving means for redirecting the current through the shunt circuit and a resistance means, such as a resistor, for creating a resistance in the shunt circuit greater than in the parallel part of the ignition circuit.

An associated method of disabling an automobile of the type discussed above also forms a part of the invention and includes the steps of: receiving a remotely transmitted disable signal and connecting the low current capacity portion of the ignition circuit, in response to receipt of the disable signal, through a low resistance connector to the negative terminal of the battery so that the current flowing through the portion exceeds the current capacity and a break in the ignition circuit is thereby formed. The method may also include the further steps of receiving a remotely transmitted enable signal and disconnecting the low current capacity portion of the ignition circuit, in response to receipt of the enable signal, so as to close the break in the ignition circuit. The method may also include the steps of transmitting the disable signal prior to the receiving step and transmitting the enable signal prior to the receiving the enable signal step.

Another associated method of disabling an automobile forms a part of the present invention and includes the steps of receiving a remotely transmitted disable signal and shunting the current from the battery, in response to receipt of the disable signal, to redirect the current from a portion of the ignition circuit and reduce the operating voltage to the electronic components so as to render the components inoperable and disable the automobile.

BRIEF DESCRIPTION OF THE DRAWINGS

Some of the objects and advantages of the present invention having been stated, others will become apparent as the description proceeds, when taken in conjunction with the accompanying drawings, in which.

DETAILED DESCRIPTION OF THE PREFERRED EMBODIMENTS

The present invention will now be described more fully hereinafter with reference to the accompanying drawings, in which preferred embodiments of the invention are shown. This invention, may however, be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout.

Figure 1:
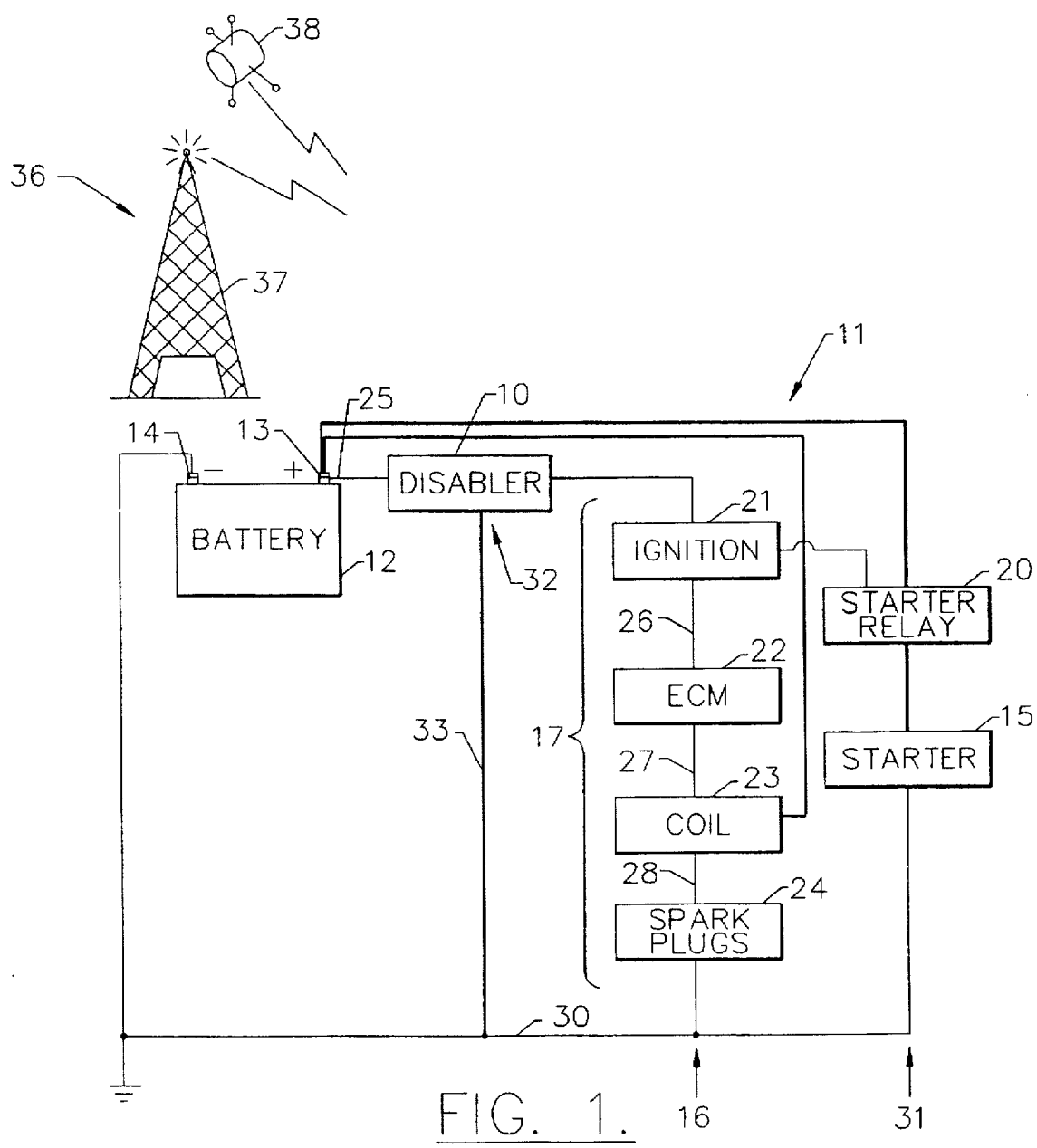
FIG. 1 is a schematic illustration of an automobile electrical system including a remote disabler device according to the present invention.

FIG. 1 illustrates the remote automobile disabler device 10 according to the present invention as installed in a conventional automobile electrical system 11 (automobile not shown). As would be appreciated by one of ordinary skill in the art, however, the particular electrical system of the subject automobile is not critical to the operation of the invention.

The electrical system 11 includes a battery 12 which is typically a 12 volt DC battery having two posts which comprise positive 13 and negative 14 terminals. The negative terminal 14 is connected to the frame of the automobile so as to be grounded. The battery 12 supplies all electrical power to the various electrical systems and subsystems of the automobile when the alternator is not operating and, as such, must be capable of supplying sufficient power to operate the starter motor 15 so as to crank the engine for brief periods while the engine is being started. The power requirements for a starter motor 15 can be quite high and the battery 12 is typically capable of supplying at least 100 amps. The starter motor 15 is typically activated by way of a relay 20 in response to a signal from an ignition switch 21.

The automobile electrical system 11 also includes an ignition circuit 16 having a variety of electrical and electronic components 17 associated with the ignition functions of the engine. For example, the electrical system 11 may include an engine control module (ECM) 22 for controlling the various functions of the engine operating systems such as ignition timing and spark advance and fuel/air metering for electronic fuel injection. In addition, the electrical system will typically include an inductive coil 23 or other electronic device, to periodically generate a high voltage, and spark plugs 24 for discharging that voltage in the form of an arc across the electrodes of the spark plug so as to ignite the fuel/air mixture.

Of these components 17, at least the ECM 22 will include sensitive electronic elements which require only a very low current supply on the order of milliamps. Indeed, these elements are similar to elements found in a computer and are not capable of handling a large power supply, as disclosed in my copending U.S. patent app. Ser. No. 08/314,152, entitled "*Remote Computer Disabler Device and Associated Method.*" Accordingly, it is necessary that these components include a relatively high electrical resistance so that, in accordance with Ohm's law, only a relatively small current passes through the electronic elements within. Each of the electronic components 17 thus causes a voltage drop in the ignition circuit 16, the sum of which, in accordance with Kirchhoff's law, equals the supply voltage of the battery 12, which in most cases will be 12 volts.

As would be understood by one of ordinary skill in the art, the electronic elements require an operating voltage which is at least equal to a minimum threshold voltage. For example, if the threshold voltage is 5 Volts DC, the electronic elements will not operate properly with any supply voltage below 5 Volts DC.

The ignition circuit 16 thus includes several portions which extend between the terminals 13,14 of the battery and the adjacent components 17. For example, as shown in FIG.

1, one portion 25 connects the positive terminal 13 of the battery 12 to the ignition switch 21 and a subsequent portion 26 connects the ignition switch 21 to the ECM 22. Other portions 27, 28 connect the ECM 22 to the coil 23 and the coil to the spark plugs 24. A final portion 30 connects the spark plugs 24 to ground or the negative terminal 14 of the battery.

Because of the high resistance of the components 17 within the circuit 16, as discussed above, the various portions of the ignition circuit are subjected to only a very low amperage and, accordingly, may have a low current capacity. For example, in the interests of economy, these portions are typically made of a relatively small gauge wire. In particular, the portion 25 of the ignition circuit 16 extending between the battery 12 and the ignition switch 21 is of a low current capacity. In contrast, the circuit 31 which supplies power to the starter motor 15 must be formed of heavier gauge wire (as illustrated with heavier lines in FIG. 1) so as to be capable of handling the large current supplied when the engine is being started.

Connecting means 32 of the present invention is connected between a low current capacity portion of the ignition circuit 16 adjacent the positive terminal 13 of the battery 12, and the negative terminal 14 as shown in FIG. 1. In particular, the disabler device 10 is connected in the ignition circuit 16 between the positive terminal 13 of the battery 12 and the ignition switch 21 such that a low current capacity portion of the ignition circuit 16 is located between the battery 12 and the disabler 10. A low resistance ground connection 33, which, as shown in FIG. 1, may comprise a heavy gauge wire, may extend between the disabler 10 and the portion 30 of the ignition circuit 16 returning to the negative terminal 14 of the battery 12 or ground.

Figure 2:
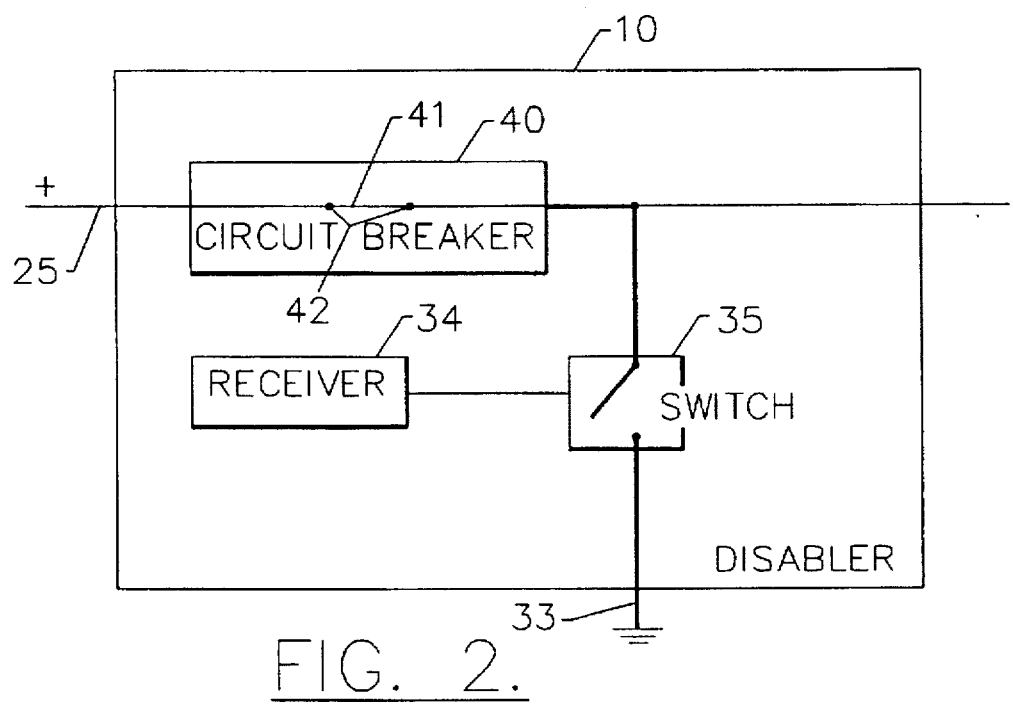
FIG. 2 is a schematic illustration of the remote disabler device of the present invention shown when the device is not activated.
Figure 3:
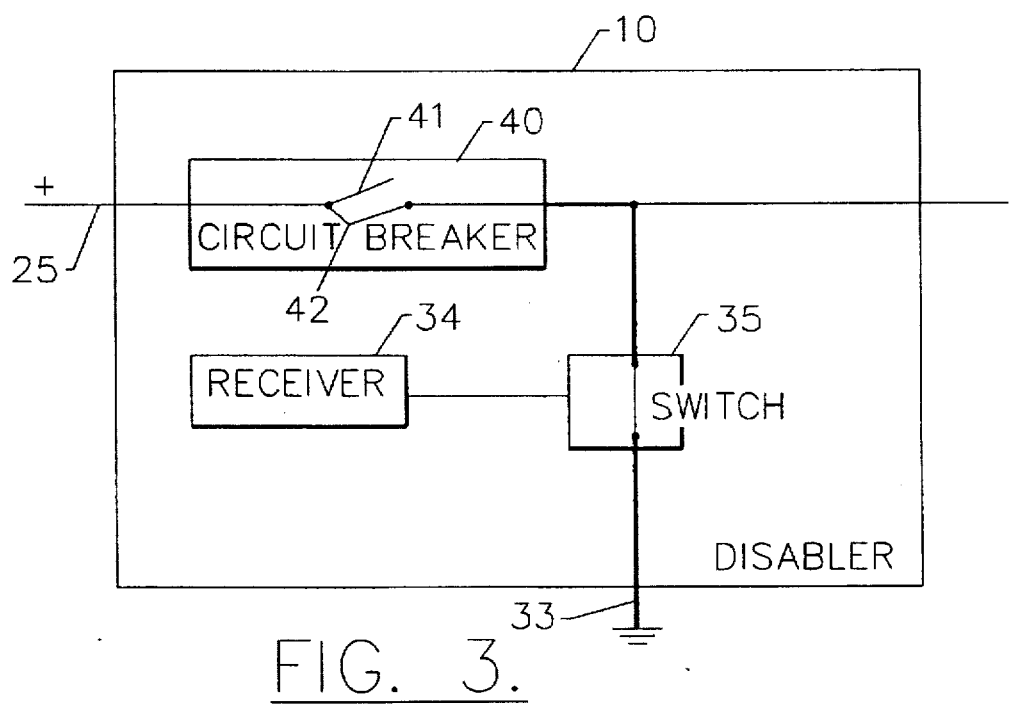
FIG. 3 is a schematic illustration of the remote disabler device of the present invention shown when the device is activated so as to disable the automobile.

The internal wiring of the disabler device 10 is illustrated in FIGS. 2 and 3 and includes means 34 for receiving a remotely transmitted disable signal, which may comprise a radio frequency receiver, as discussed more fully below.

Connecting means 32 of the present invention may also include a selectively operable switch 35 connected between the low current capacity portion 25 and the ground connection 33. The switch 35 is operatively connected to the receiver 34 and is normally in the open position as shown in FIG. 2. When the receiver 34 receives the disable signal, however, the switch 35 is moved to the closed position as shown in FIG. 3. Accordingly, when the automobile is functioning without the disabler 10 having been activated, the low current required by the high resistance components 17 passes from the positive terminal 13 of the battery 12, through the low current capacity portion 25, through the disabler device 10, through the high resistance components 17 and returns to the negative terminal 14 of the battery.

Referring again to FIG. 1, the present invention also includes a system for remotely disabling an automobile and includes transmitting means 36 for transmitting the disable signal. Accordingly, when an automobile including the disabler of the present invention is stolen, the owner causes a disable signal to be transmitted from the transmitting means 36. The disable signal is received by the disabler 10 which thereafter disables the automobile in the manner subsequently described. As shown in FIG. 1, the transmitting means 36 may comprise at least one radio frequency transmission tower 37 and, preferably, comprises a network of such towers which would provide a large coverage area for the disable signal. Alternatively, the transmitting means 36 could comprise at least one radio frequency transmission satellite 38 which could provide wide area coverage.

When the receiver 34 receives a disable signal, it causes the switch 35 to be closed so that the low current capacity portion 25 becomes directly connected to the negative terminal 14 of the battery 12 through the ground connection 33, as shown in FIG. 3. Accordingly, a parallel shunt circuit is created whereby current is redirected from a portion of the ignition circuit through the shunt circuit to the negative battery terminal 14. This path is of much lower electrical resistance relative to the parallel path through the high resistance components 17 and so, in accordance with Ohm's law, the current through the low current capacity portion 25, the disabler device 10 and the ground connection 33 is greatly increased. The increased current is too great for the low current capacity portion 25 of the ignition circuit 16, however, and that portion will be physically destroyed. The destroyed portion causes a break in the ignition circuit 16 and, accordingly, the automobile will be permanently disabled.

The disabler device may also include a circuit breaker 40 as shown in FIGS. 2 and 3 if the owner does not wish to permanently disable the vehicle once the device is activated. The circuit breaker 40 will thus move to the open position shown in FIG. 3 when the current increases in response to the disable signal, and cause a break in the ignition circuit 16 without destroying any portion of the electrical system 11. The circuit breaker 40 may be located in a hidden position and reset once the stolen automobile has been located.

In a preferred embodiment, the circuit breaker 40 is of the self-resetting type which will create the break in the ignition circuit 16 when the switch 35 is closed but which will automatically reset itself when the switch 35 is opened. Such self-resetting circuit breakers 40 typically include a temperature sensitive spring member (not shown) connected to the jumper bar 41 between the poles 42 of the breaker. When heated, such as in response to a high current, the spring member moves the jumper bar 41 away from one of the poles 42. When the circuit breaker 40 cools, which it will do when a break in the circuit 16 is formed and no current passes therethrough, the jumper bar 41 is moved back into contact with both poles 42 of the breaker and the circuit is reformed. If the switch remains closed, however, the circuit breaker 40 will immediately be opened again when the jumper bar 41 contacts the open pole.

The receiver 34 may also be responsive to an enable signal which may be transmitted from the transmitting means 36 once the stolen vehicle has been located. In response to the enable signal, the receiver 34 moves the switch 35 to the open position as shown in FIG. 2. If the circuit breaker 40 is self-resetting as discussed above, it will re-close the ignition circuit 16 once it has cooled so as re-enable the automobile electrical system 11.

Figure 4:
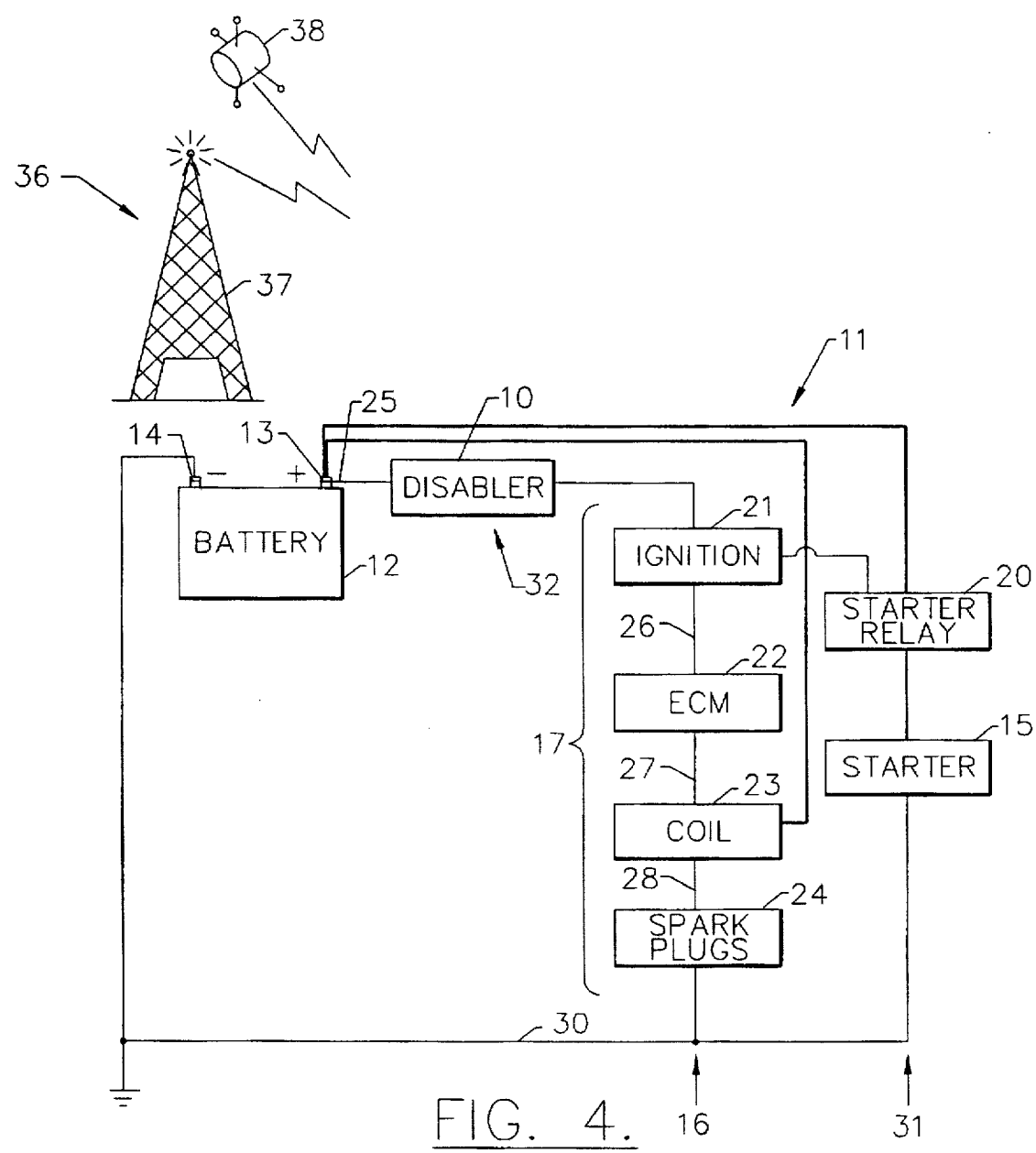
FIG. 4 is a schematic illustration of an automobile electrical system including another embodiment of the remote disabler device according to the present invention.
Figure 5:
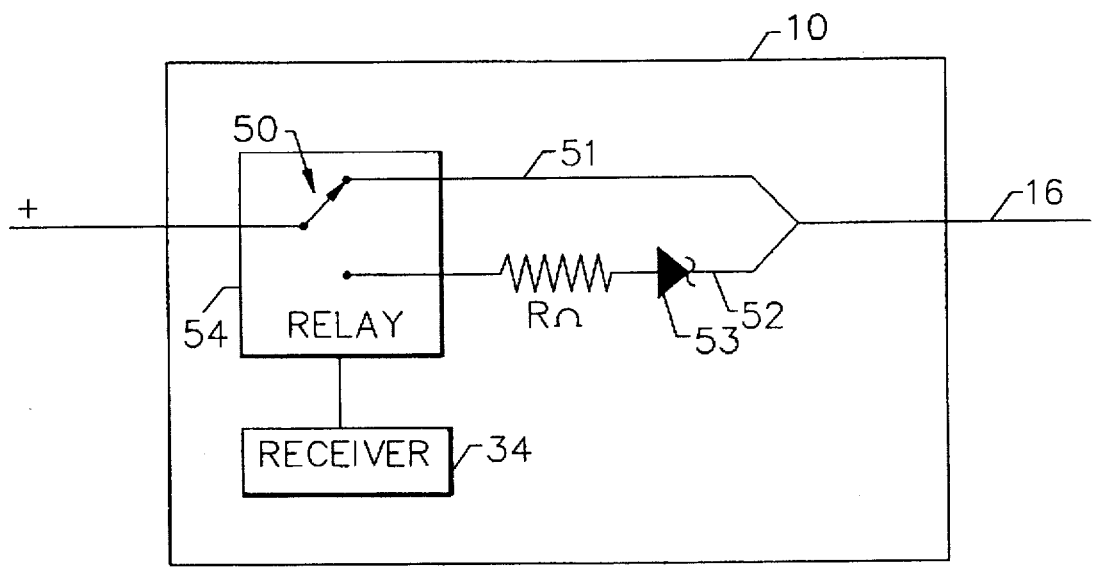
FIG. 5 is a schematic illustration of the disabler of FIG. 4 shown when the device is not activated.
Figure 6:
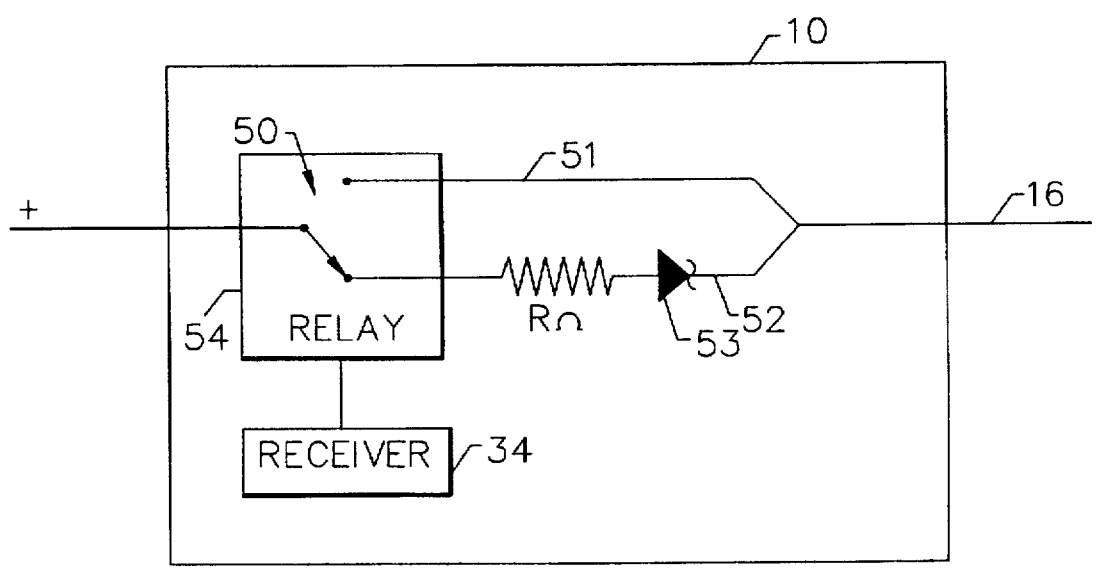
FIG. 6 is a schematic illustration of the disabler of FIG. 4 shown when the device is activated.

Another embodiment of the remote disabler device 10 is illustrated in FIGS. 4–6. As shown in FIG. 4, this embodiment is installed in the same location in the automobile electrical system 11 as the embodiment discussed above. It will be understood from the description which follows, however, that the ground connection 33 may be omitted.

The remote disabler device 10 of this embodiment is shown in more detail in FIGS. 5 and 6 and includes a receiver 34 of the type discussed above. The receiver 34 is operatively connected to a selectively operative switch 50 which is movable between a portion 51 of the ignition circuit 16 and a bypass circuit 52. The bypass circuit 52 includes a resistor $R_\Omega$ and a Zener diode 53 to prevent feedback currents. A preferred resistor $R_\Omega$ has a resistance of 180 ohms and a preferred Zener diode 53 has a rating of 10V-5 watts. The switch 50 is normally in the position shown in FIG. 5 when the disabler 10 has not been activated.

When the receiver 34 receives a disable signal in the manner discussed above, it causes the switch 50 to be moved to the position shown in FIG. 6. If the output of the receiver 34 is not sufficient to throw the switch 50, a relay 54 may optionally be used to mechanically move the switch. Accordingly, the current flowing in the ignition circuit 16 will be redirected through the bypass circuit 52 so as to bypass the parallel ignition circuit portion 51. The current passes through the resistor $R_\Omega$ which creates a voltage drop across the resistor.

The voltage drop across the resistor $R_\Omega$, however, will reduce the operating voltage seen by the electronic elements of the components 17. In other words, in order to satisfy Kirchhoff's law, the voltages across each of the components 17 will be reduced (because the battery voltage remains constant) to compensate for the voltage drop across the resistor $R_\Omega$. Because of the size of the resistor $R_\Omega$, the voltage reduction is enough to reduce the operating voltages to the components 17 to below the threshold voltages of the electronic elements therein. Accordingly, a disable signal activates the shunt circuit 52 to render the ignition circuit 16 inoperable and the automobile disabled.

After the automobile has been recovered, an enable signal can be sent and the switch 50 will be moved back to the position shown in FIG. 5 so that the ignition circuit will function in its normal manner.

It will be seen that each embodiment of the invention introduces an obstructing circuit interfering with connection of operating voltage to electrical and electronic components associated with the ignition functions of the engine. In the embodiment of FIG. 1, the obstructing circuit comprises disabler 10 of FIGS. 2 and 3, and ground connection 33. In the embodiment of FIG. 4, the obstructing circuit comprises disabler 10 of FIGS. 5 and 6. In both embodiments, the obstructing circuit is activated to interfere with connection of operating voltage to electrical and electronic components responsive to an external signal received by receiver 34 of either embodiment, receiver 34 being controllably connected to the obstructing circuit within disabler 10 of each embodiment.

In the drawings and specification there has been set forth preferred embodiments of the invention and, although specific terms are employed, the terms are used in a generic and descriptive sense only and not for purposes of limitation, the scope of the invention being set forth in the following claims.

That which is claimed is:

1. A remote disablement device enabling remote disablement of an automobile having an ignition system including ignition components associated with ignition functions of an engine, said remote disablement device comprising:

an ignition circuit connecting electrical power to said ignition components a disabler is connected in the ignition circuit between the positive terminal of a battery and an ignition circuit portion such that a low current capacity portion of the ignition circuit is located between the battery and the disabler;

said disabler having said ignition circuit portion passing current to said ignition components, an obstructing circuit comprising a bypass circuit bypassing said ignition circuit portion, including a resistor and a Zener diode for preventing feedback currents disposed within said bypass circuit, and disposed to be connectable to said ignition components, a selectively operative switch selectively connecting said ignition circuit portion and said bypass circuit to said ignition components, and selectively operable switch means for restoring operation of said ignition circuit in the normal manner; and a receiver controllably connected to said obstructing circuit within said disabler, said receiver disposed to activate said obstructing circuit to interfere with connection of operating voltage to said ignition components responsive to an external signal received by said receiver.

2. The remote disablement device according to claim 1, further comprising transmitting means for transmitting a disabling signal causing said receiver to activate said obstructing circuit.

3. The remote disablement device according to claim 2, said transmitting means comprising at least one radio frequency transmission tower.

4. The remote disablement device according to claim 2, said transmitting means comprising at least one radio frequency transmission satellite.

* * * * *